A. BOOMERSHINE.
OIL PROTECTOR FOR BRAKE DRUMS.
APPLICATION FILED OCT. 18, 1917.
1,270,776. Patented July 2, 1918.
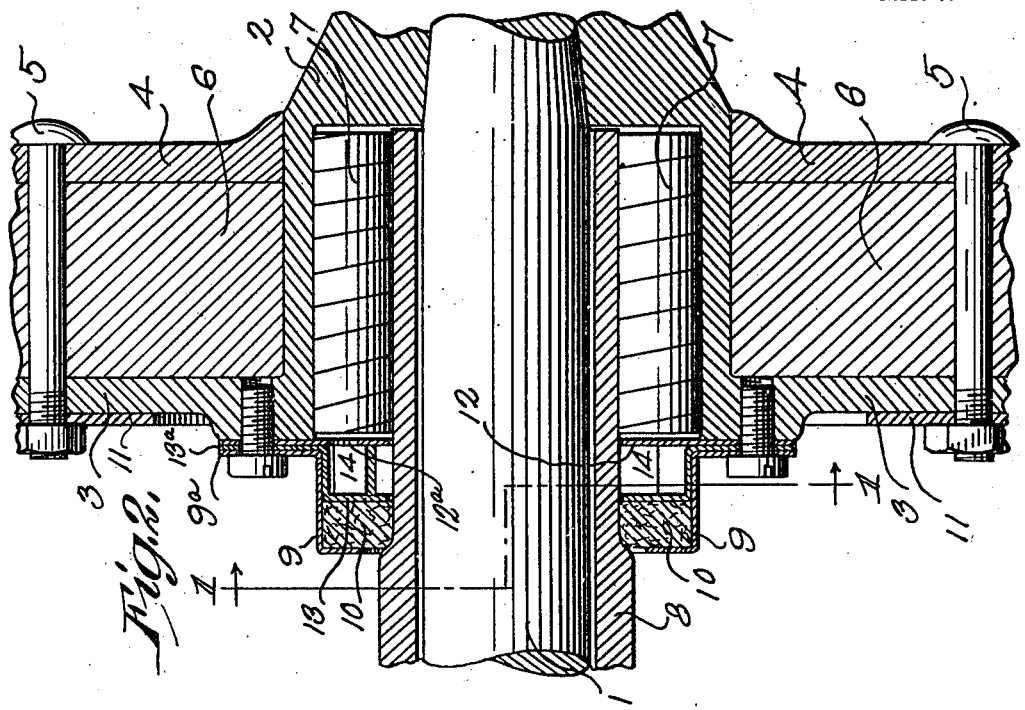
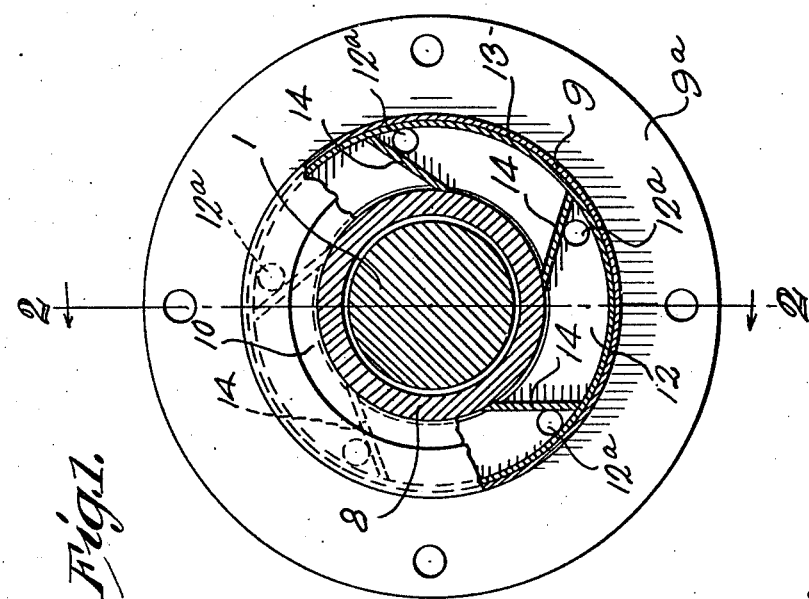
Witness
R. W. Hoagland
Inventor
Adam Boomershine
By
Attorneys A. BOOMERSHINE.
OIL PROTECTOR FOR BRAKE DRUMS.
APPLICATION FILED OCT. 18, 1917.
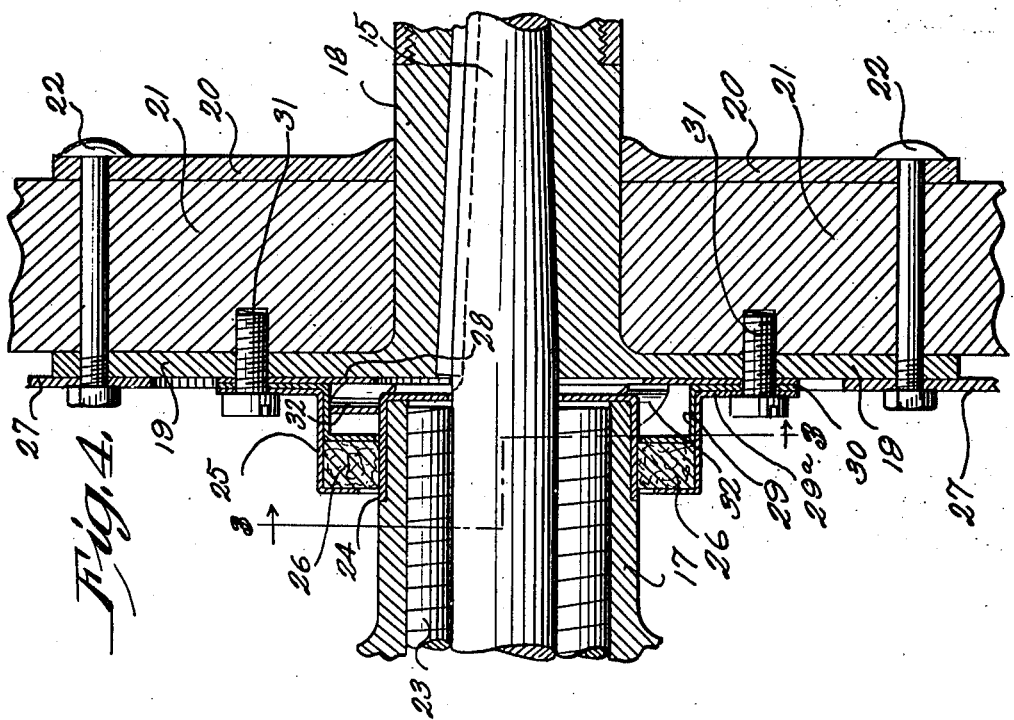
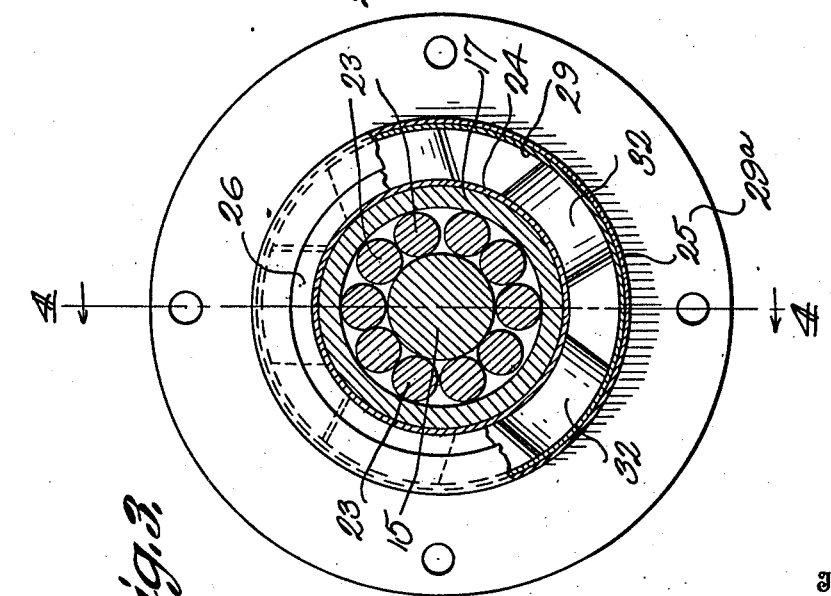

UNITED STATES PATENT OFFICE.

ADAM BOOMERSHINE, OF DAYTON, OHIO.

OIL-PROTECTOR FOR BRAKE-DRUMS.

1,270,776.  Specification of Letters Patent.  Patented July 2, 1918.

Application filed October 18, 1917. Serial No. 197,216.

*To all whom it may concern:*

Be it known that I, ADAM BOOMERSHINE, a citizen of the United States, residing at Dayton, in the county of Montgomery and State of Ohio, have invented certain new and useful Improvements in Oil-Protectors for Brake-Drums, of which the following is a specification.

This invention relates to improvements in lubricant retarding devices for the rear wheels of automobiles.

The object of the invention is to provide an arrangement whereby the oil or grease which finds its way from the differential housing through the axle housing into the bearings of the rear wheels of automobiles from working into the brakes and thereby causing the brakes to slip and also from dripping onto the wheels, this being a well known difficulty experienced by users of automobiles.

A further object of the invention is to provide an arrangement of the character referred to which will not only prevent the oil and grease from being carried to the brakes, but will permit and facilitate the oil and grease draining from the differential housing being retained in the bearings of the rear wheel, thus eliminating waste of the lubricating material.

A further object of the invention is to provide a device of this character which may be readily installed in automobiles now in use, as well as being utilized as a standard equipment for new machines.

To this end the invention consists in a device which is located in the path of the oil between the brakes and the bearings and also, obviously in the path of the oil between the bearings and the exterior of the wheel which will have the effect of preventing the oil and grease from passing from the bearings into the brakes or onto the wheels, but at the same time allowing such oil or grease as drains from the differential to flow freely into the bearings for lubricating purposes and retaining it there.

In the accompanying drawings:—

Figure 1 is a section on the line 2—2 of Fig. 1.

Fig. 2 is a section on the line 1—1 of Fig. 1.

Fig. 3 is a modification, the view being a sectional view on the line 4—4 of Fig. 4.

Fig. 4 is also a view of the same modification, being the section on the line 3—3 of Fig. 3.

Referring first to Figs. 1 and 2, there is shown so much of the rear wheel, its bearings, the drive shaft and the housing for the same as is necessary to illustrate my improvements, which are shown applied thereto; the particular construction shown in these two views being that employed in an automobile of the Maxwell make. The drive shaft is represented by 1, and the hub of the wheel by 2; the drive shaft in this particular construction being secured to the differential gears at its inner end to prevent lateral displacement and also being fastened to the hub at its outer end by a nut (not shown) in a well known manner. The hub is provided with a circular flange 3 and a circular plate 4 and bolts 5 are employed for clamping the spokes 6 of the wheel to the hub. Roller bearings 7 are interposed between the hub and the axle or shaft housing 8, this shaft housing being of the usual form which is secured to the differential housing and projects into the hub of the wheel.

As is usual in structures of this character, there is secured to the hub a circular casing 9 having a packing 10 which snugly fits the housing 8, whose object is to prevent the oil and grease which finds its way from the differential housing from working through the bearings and dropping into the brake drum and onto the wheels, a portion of the brake drum being represented by 11; this brake drum being secured to the hub by the bolts 5 previously described. It is well known, however, that this casing and packing fail to accomplish their object, for, in all makes of machines, particularly where the differential housing has been well filled with grease or oil, a considerable quantity of grease and oil will work past the packing and casing and drop into the interior of the drum, in some cases even finding its way to the exterior of the brake drum. It is also usual to insert between the casing 9 and the bearings, a washer or plate 12 surrounding the housing 8 and secured to the hub by the same bolts 5 previously described.

In order to prevent the oil and grease from passing from the bearings into this packing casing 9 and thence into the brake drum, and onto the wheels, I have inserted in the casing a cup-shaped ring 13 provided with a series of angularly arranged vanes or blades 14; this cup-shaped ring having a peripheral flange 13ª which is clamped between the flange 9ª of the casing 9 and the washer 12. The open side of the ring 13 communicates with the bearing 7.

As a result of this construction, as the wheel rotates, the ring 13 will rotate therewith, the action of the angularly-arranged blades 14 being to gather up and force back into the bearings 7, through the openings 12ª in the washer 12, such oil and grease as tends to escape from the bearings; the ring 13 and its blades 14 acting in the nature of a centrifugal pump. Consequently, no oil or grease whatever will find its way through the packing in casing 9 and into the brakes, or onto the wheels, keeping the brakes and wheels thus entirely free from the lubricant, and preventing waste of oil or grease. At the same time, my device does not prevent the oil and grease from the differential from finding its way into the bearings, but on the contrary tends to keep such oil and grease in the bearings and thus maintain them at all times properly lubricated.

In Figs. 3 and 4 I have shown my improvement applied to a construction of the Ford type, in which 15 represents the differential or shaft, 17 the housing for the same, 18 the hub of the wheel having the usual flange 9 between which and the ring 20 the spokes 21 of the wheel are clamped by the bolts 22; the driving shaft 15 being secured to the differential gears in the hub in a manner described, in connection with the other arrangement. The roller bearings 13 in this construction are located outside of the wheel proper, a thimble 14 through which the drive shaft extends being secured to the end of the housing 17. This construction has the same casing 25 and packing 26 and the same washer 28. My improvement consists of a similar cup-shaped ring 29 having a flange 30 which is clamped between the washer 28 and the flange 29ª of the packing casing by the screws 31. The vanes or blades 32 in the present case, however, are of a different form, being of a spiral or auger shape, as I have found this form more desirable in this construction in view of the fact that the oil or grease must be forced in an axial direction back into the bearings instead of laterally as in the Maxwell arrangement.

In both types of construction described I am enabled to apply my devices by simply applying a new packing casing of larger dimensions in order to accommodate my retarder or pump and the arrangement may also be applied to automobiles having rear wheel hubs and axles of other forms. A portion of the brake drum in this modified construction is also shown, being represented by 27, it not being deemed necessary to show the usual external contracting and internal expanding brake bands, which, of course, are of the usual form.

Having thus described my invention, I claim:—

1. In a structure of the character described, a rotatable element, a bearing for the same, and a rotatable force feed device arranged between said element and bearing to prevent lubricating material from escaping from said bearing, said device comprising a series of vanes.

2. In a structure of the character described, a rotatable element to which brakes are capable of being applied, a bearing for said rotatable element, and a rotatable force feed device arranged between said bearings and said rotatable element to prevent leakage of oil from said bearings into the brakes, said device comprising a series of vanes.

3. In a device of the character described, a rotatable element, bearings for the same, packing material connected with said rotatable element and arranged about said bearings, and a rotatable force feed device connected with said rotatable element between said packing material and said bearings, said device comprising a series of vanes.

4. In a device of the character described, a rotatable element, bearings for the same, a packing casing connected with said rotatable element and surrounding said bearings, packing material therein, and a rotatable force feed device in said packing casing between said packing and said bearing, said device comprising a series of vanes.

5. In a structure of the character described, a rotatable element, a bearing for the same and a rotatable force feed device connected to said rotatable element and arranged to prevent the lubricating material from escaping from said bearing, said device comprising a vane.

6. In a structure of the character described, a rotatable element to which brakes are capable of being applied, a bearing for said rotatable element and a rotatable force feed device connected to said rotatable element and arranged to prevent leakage of the lubricant into the brakes, said device comprising a vane.

7. In a structure of the character described, a rotatable element, bearings for the same, a chambered element rotatably connected with said rotatable element and surrounding said bearings to receive lubricant escaping from said bearings, and a force feed device associated with said chambered element arranged to receive the lubricant at the point of escape from said bearings and force it back into said bearings at another point so as to induce a circulation of lubricant through said chambered element.

8. In a structure of the character described, a rotatable element, bearings for the same, a support for said bearings, a chambered element rotatably connected with said rotatable element and surrounding said bearings to receive lubricant escaping from said bearings between the same and said support, and a force feed device associated with said chambered element arranged to receive the lubricant at the point of escape from said bearings and force it back into said bearings at another point so as to induce a circulation of lubricant through said chambered element.

9. In a structure of the character described, a rotatable element and anti-friction bearings for the same, a non-rotatable support for said bearings, a chambered element arranged about one end of said bearings having a wall adjacent the end of the bearings and closely surrounding said support, said wall having a discharge orifice communicating with said bearings at points removed from said support, and a force feed device in said chambered portion arranged to receive lubricant which escapes from said bearings between said wall and said support and force the same through said apertures back into said bearings.

In testimony whereof, I have hereunto set my hand this sixth day of October, 1917.

ADAM BOOMERSHINE.

Witnesses:
   CHAS. F. HORA,
   LEWIS POWELL.